Figure 1:
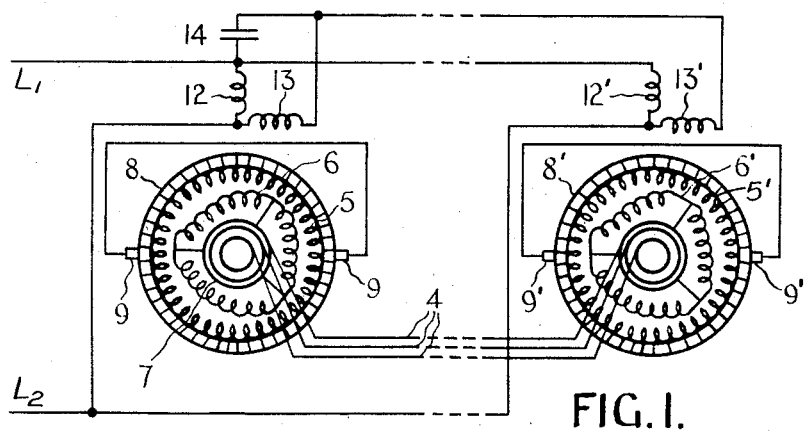

Sept. 23, 1958  SHAFI-UDDIN A. CHOUDHURY  2,853,665
POWER TYPE SELSYN OPERATION OF PLURAL
DYNAMO-ELECTRIC MACHINES
Filed Oct. 19, 1954  2 Sheets-Sheet 1

INVENTOR
SHAFI-UDDIN AHMED CHOUDHURY
BY
ATTORNEY

Sept. 23, 1958 SHAFI-UDDIN A. CHOUDHURY 2,853,665
POWER TYPE SELSYN OPERATION OF PLURAL
DYNAMO-ELECTRIC MACHINES
Filed Oct. 19, 1954 2 Sheets-Sheet 2

INVENTOR
SHAFI-UDDIN AHMED CHOUDHURY
BY
ATTORNEY

United States Patent Office 2,853,665
Patented Sept. 23, 1958

2,853,665

POWER TYPE SELSYN OPERATION OF PLURAL DYNAMO-ELECTRIC MACHINES

Shafi-Uddin Ahmed Choudhury, Rugby, England, assignor to The British Thomson-Houston Company Limited, a British company Application October 19, 1954, Serial No. 463,289

Claims priority, application Great Britain October 21, 1953

4 Claims. (Cl. 318—44)

This invention relates to systems employing self-synchronising dynamo-electric machines and more particularly to systems using machines of the kind known as selsyns which are employed for the remote transmission of angular motion and torque. Systems employing such machines are characterised by the use of one machine as a transmitter and another as a receiver, the construction of and the connections between the machines being such that any angular motion of one machine, termed the transmitter, is or tends to be reproduced by the motion of the other, or others, termed the receiver(s).

When using selsyns of normal construction, the torque required to turn the receiver has to be supplied by the transmitter.

In British patent specification No. 582,341, a modified form of such a dynamo-electric machine is described in which the torque required to drive the transmitter is reduced to a fraction of the torque required by the co-operating receiver by providing the transmitter machine with a commutator with which short-circuited brushes are associated in addition to the sliprings which are necessary for selsyns of normal construction. In the arrangement disclosed in the above specification, the receiver machine co-operating with the transmitter is a normal type of selsyn, i. e. one having a three-phase winding on the stator and a single-phase winding on the rotor, the rotor not being provided with a commutator.

The main object of the present invention is to improve a system of the character in question by reducing still further the driving power required of the transmitter.

A further object is to provide a system which will enable the receiver to be switched on or off while the transmitter is rotating, the running up to speed and synchronising of the receiver with the transmitter following automatically with the switching on of the receiver.

In a system employing self-synchronising dynamo-electric machines one of which operates as a transmitter and another as a receiver, according to the invention each of the machines is provided with windings so connected to a source of A. C. supply that the machine is thereby rendered capable of producing a mechanical power output as well as maintaining its synchronism with the other machine(s).

We may thus employ, in carrying out the invention, a receiver machine functionally similar to that employed for the transmitter. Preferably, the receiver machine is of the selsyn type provided with a commutator and is thus of a similar construction to that of the transmitter of patent specification 582,341. The power output of the system is thus increased without increasing the torque required to drive the transmitter.

Motoring windings on the transmitter and receiver machines in quadrature with the main windings are connected in parallel with one another and to the source of A. C. supply for the system through a capacitor to afford the desired excitation.

Figure 2:
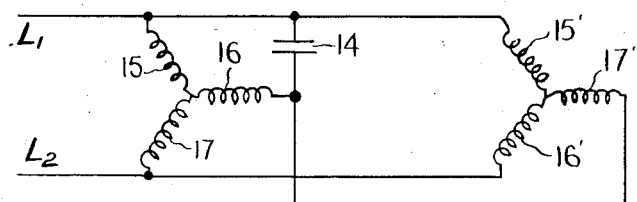
Figure 3:
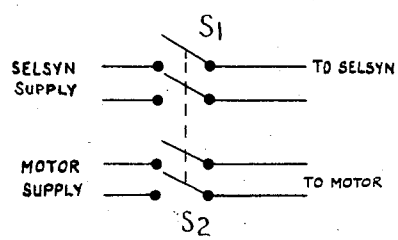
Figure 4:
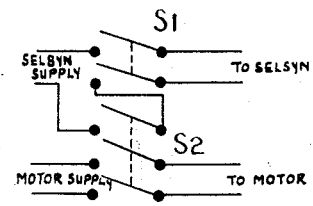

The invention will be more readily understood from the following description of the accompanying diagrams, in which Fig. 1 illustrates a system of the invention; Fig. 2 shows a modification of the field windings of the selsyns illustrated in Fig. 1, Figs. 3 and 4 switching connections which may be employed. The same reference numerals, but primed, are used to indicate in the receiver similar parts to those in the transmitter.

Figure 5:
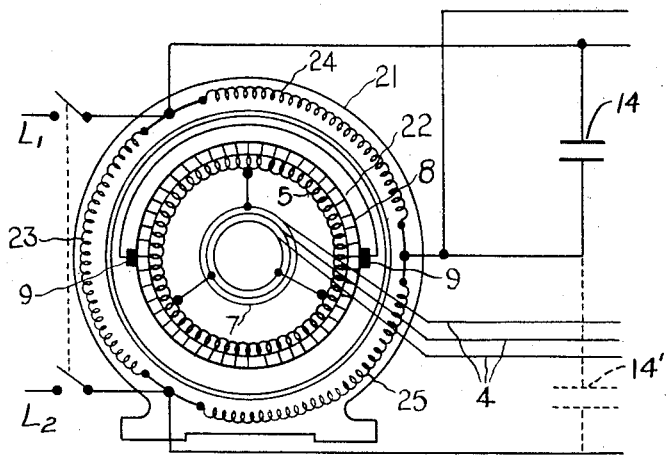

Fig. 5 is an end view of a dynamo-electric machine serving as a transmitter or receiver as used in the present invention.

As shown in Fig. 1, the transmitter machine consists of an armature member or rotor carrying two windings, a primary winding 5 and a secondary winding 6, of which 5 is connected to a commutator 8 and 6 is connected to the slip-rings 7. Alternatively, instead of a separate secondary winding 6, tappings on the primary commutator winding 5 spaced apart by 120° electrical can be taken to the slip-rings. A separate secondary winding 6 is essential if the distance between the transmitter and receiver is such that the resistance of the connecting leads becomes comparable with that of the commutator winding. The armature consists preferably of a slotted laminated drum of magnetic material having the windings embedded in the slots in the usual manner.

The field member has a field winding 12 and in addition a motoring winding 13 whose axis is 90 electrical degrees displaced from the winding 12. Short-circuited brushes 9 are suitably mounted to bear upon the commutator in such a manner as to form a closed circuit in the quadrature axis only, i. e., at right angles (electrical) to the field winding, so that no currents are induced in the closed circuit directly by current in the field winding.

The receiver machine is constructed similarly to the transmitter. The secondary windings 6 and 6' are interconnected by the conductors 4 and the field windings 12 and 12' are excited from a common source of single phase alternating supply indicated by conductors $L_1$ and $L_2$. The motoring windings 13 and 13' are connected in parallel and then connected to the supply in series with a suitable capacitor 14.

Referring to Fig. 5, the stator core or field member 21 carries the field and motoring windings, while the rotor core 22 carries the armature windings. Both cores have slots similar to those in a slip ring induction motor which contain the windings. The commutator 8 on the rotor is connected to the armature winding 5 in the usual manner, while tappings spaced apart by 120° electrical are connected to the slip rings 7 to cause the armature winding also to serve as the secondary winding. The stator slots contain three phases 23, 24, 25, of a balanced or unbalanced polyphase winding distributed in the slots. These phases are shown connected in delta but they could be connected in star or be replaced by an equivalent two-phase winding. Phase winding 23 is connected to the single-phase supply $L_1$—$L_2$ and constitutes the field winding, while phase windings 24 and 25 constitute the motoring winding 13 and are energised from the supply through capacitor 14. Capacitor 14 is connected as shown for motoring in one direction and is connected in the dotted position 14' for the reverse direction of rotation. The short-circuited brushes 9 are set so that there is no current in the short-circuiting connection when the machines are excited without capacitor 14.

If the commutated winding and the associated short-circuited brushes are omitted the machine will be recognized by those skilled in the art as a selsyn machine of the previously well-known kind, in which the primary winding is winding 12, and the secondary winding 6.

If, therefore, the armature of the transmitter is rotated, the rotor of the receiver will tend to rotate in synchronism with it. If there is a torque load opposing the rotation of the receiver its rotor will lag behind that of the transmitter so that the excitation axes are no longer coincident. As a result there will be a component of E. M. F. in the secondary circuit which will give rise to a current in the quadrature axis of both machines. The interaction of this current with the field excitation of the receiver machine is that by virtue of which the receiver machine exerts a torque tending to re-align its axis with that of the transmitter.

In the present case, however, we have introduced, by means of the commutated windings and their short-circuited brushes 9, 9', a closed circuit in the quadrature axis. This winding will therefore tend to carry a reflection of the quadrature secondary current already referred to, and in so doing will tend to produce a torque in the opposite direction to that produced by the secondary quadrature current. If the impedance of the short-circuited quadrature path were zero the torque due to the current in it would exactly counteract the torque due to current in the secondary so that no torque would appear at the transmitter shaft apart from bearing and brush friction. As, however, the impedance of the quadrature short-circuited path cannot be entirely zero a certain amount of torque will appear at the transmitter shaft, and will be approximately proportional to, though only a very small fraction of, the load on the receiver.

It will be obvious to those skilled in the art that the short-circuited quadrature winding formed by the commutated winding has the effect of reducing considerably the impedance of the transmitter quadrature axis and so causes the receiver torque to increase rapidly with small angles of lag between the receiver and transmitter, thus giving a "tight" electrical coupling between transmitter and receiver.

The transmitter is driven by a motor, which may be one with shunt characteristics and of the variable speed type, driving in addition any load, e. g. a conveyor. The receiver is coupled to another load, e. g. another conveyor which is to be driven in mutual synchronism with the load connected to the driving motor.

The advantage of the system of the present invention as compared with one employing ordinary selsyn machines is that the power required to drive the transmitter may need to be only a fraction of the power delivered by the receiver. In fact this power may be made negative, i. e. the transmitter may supply some motoring power to the driving motor which controls the speed of the equipment. This is done by suitable choice of the capacitor.

The advantage of the system of the present invention as compared with that of patent specification No. 582,341, is that, for running duty, a greater output can be obtained from a given frame size of machine for the following reasons. The windings 13 and 13' when connected to the source of supply in series with capacitor 14, pass currents in the commutator windings 5 and 5' by transformer action with such a phase relationship with the flux produced by the field currents in 12 and 12' that both transmitter and receiver machines develop a motoring torque which would make the machines run independently of any external driving power. Due to the relatively high impedance of the capacitor employed in comparison to machine impedance, the change in current in the windings 5 and 5' is small for large changes of speeds. This gives the machines more or less constant torque characteristic for all speeds, so that it is necessary for another motor to hold the speed to any required value.

In the system shown in patent specification No. 582,341, the whole power of the receiver is derived from current which flows through the secondary windings of the receiver from the transmitter. In the present machine, as the receiver has a motoring torque of its own, part of the power is drawn by the receiver directly from the supply and only a part flows through the conductors 4 from the transmitter to the receiver. The power output can therefore be easily doubled, as compared with that obtainable from the receiver in an arrangement of the character shown in patent specification No. 582,341.

Another important advantage of the present invention is that no special control scheme is required for synchronizing the machines prior to running. The supply to lines $L_1$, $L_2$ for the excitation of the selsyns can be switched on directly either together with the supply of voltage to the motor driving the transmitter selsyn or after the motor. If the motor driving the transmitter selsyn is already running while the receiver selsyn is stationary, by reason of its connection to lines $L_1$, $L_2$ being open, the connection to lines $L_1$, $L_2$ of the receiver selsyn can be completed and the receiver will run up to speed and synchronize with the transmitter selsyn. If the transmitter and receiver machines are to be energized subsequent to the energization of the motor driving the transmitter, it is necessary to ensure that the selsyns cannot be energized when both are at a standstill unless the driving motor is energized simultaneously.

Though the field and motoring windings 12, 12' and 13, 13' of the machines in Fig. 1 as being two phase windings, they can be equivalent 3-phase windings, balanced or unbalanced, connected either in "star" or "delta" as for 3-phase induction motors. This modification of the field windings is illustrated in Fig. 2 which shows the field windings only of the machines, the rotor and its windings which are assumed to be identical with those shown in Fig. 1, being omitted. The field windings are shown as being star connected windings in Fig. 2 where 15, 16 and 17 are equivalent to 12, 13 and 15', 16', 17', are equivalent to 12', 13', the capacitors 14, 14' being connected across the terminals of the phase windings 15, 16, and 15', 16'.

The advantage of the series motoring characteristics is that the transmitter speed can be varied over very wide ranges by changes in the speed of the motor driving the transmitter or variable speed gears associated with it without having to adjust anything else in the selsyn self-motoring circuit and still keep the selsyn currents within permissible values.

Though only one receiver is shown in the diagrams, more than one can be used with one transmitter.

This invention is particularly suitable for cases where one or more synchronized drives are required to be added to an existing drive without having to change the H. P. of the existing driving motor.

What I claim as new and desire to secure by Letters Patent of the United States is:

1. A self-synchronizing system for the remote transmission of angular motion and torque comprising a transmitting dynamo-electric machine and at least one receiving dynamo-electric machine, each of said machines comprising relatively rotatable elements, one of said elements being provided with excitation and motoring windings mutually displaced electrically by substantially 90°, and the other of said elements being provided with a secondary winding connected to a commutator and a polyphase winding, brushes short-circuiting said commutated windings on an axis in quadrature with the axis of said excitation winding, means connecting all said excitation windings directly to a source of A. C. means connecting all said motoring windings to said source through a capacitor and means interconnecting said polyphase windings whereby on the supply of alternating current from said source and a rotation of one of said relatively rotating elements of the transmitter, the rotatable element of each receiver is caused to follow the rotation of the rotor of said transmitter and in following said rotor, to exercise torque independently of the torque input provided at the rotor of said transmitter.

2. A self-synchronizing system as claimed in claim 1 in which a means is provided connecting electrically equidistant points in said secondary winding to the polyphase winding on each other of said machines.

3. A self-synchronizing system for the remote transmission of angular motion torque comprising a transmitting dynamo-electric machine and at least one receiving dynamo-electric machine, each of which consists of a stator and a rotor, each said stator being provided with excitation and motoring windings mutually displaced electrically by substantially 90°, a source of single phase A. C. to which said windings are connected, said motoring windings being connected to said source through a capacitor, and each said rotor being provided with a secondary winding connected to a commutator on said rotor, brushes short-circuiting said commutator on an axis in quadrature with the axis of said excitation winding and a polyphase winding on said rotor connected to sliprings, the polyphase windings on the said transmitting machine and each of said receiving machines being interconnected through said slip rings whereby to cause the rotor of each said receiving machine to follow the rotation of the rotor of said transmitter and in following said rotor to exercise torque independently of the torque input provided at the rotor of said transmitter.

4. A self-synchronizing system for the remote transmission of angular motion and torque comprising a transmitting dynamo-electric machine and at least one receiving dynamo-electric machine, each of said machines comprising relatively rotatable elements, one of said elements being provided with excitation and motoring windings mutually displaced electrically by substantially 90°, and the other of said elements being provided with a seconadry winding connected to a commutator, slip-rings on said other element connected to equidistantly spaced points on said commutated winding to form polyphase connections, brushes short-circuiting said commutated windings on an axis in quadrature with the axis of said excitation windings, means connecting all said excitation windings directly to a source of alternating current, means connecting all said motoring windings to said source through a capacitor and means interconnecting said sliprings whereby on the supply of alternating current from said source and a rotation of one of said relatively rotating elements of said transmitting dynamo-electric machine the rotatable element of each receiving dynamo-electric machine is caused to follow the rotation of the rotor of said transmitting dynamo-electric machine and in following said rotor to exercise torque independently of the torque input provided at the rotor of said transmitting dynamo-electric machine.

References Cited in the file of this patent
UNITED STATES PATENTS 2,768,341     Landis _____ Oct. 23, 1956

FOREIGN PATENTS

683     Great Britain _____ of 1914
582,341     Great Britain _____ Nov. 13, 1946

OTHER REFERENCES

Electric Motors in Industry, Shoults, Rife and Johnson, p. 170, Fig. 6.12; p. 177, Fig. 6.17.